(12) United States Patent
Schulz et al.

(10) Patent No.: US 8,324,560 B2
(45) Date of Patent: Dec. 4, 2012

(54) OPTICAL DETECTOR DEVICE

(75) Inventors: Volkmar Schulz, Wurselen (DE); Eduard Johannes Meijer, Eindhoven (NL)

(73) Assignee: Koninklijke Philipe Electronics N.V., Eindhoven (NL)

( * ) Notice: Subject to any disclaimer, the term of this patent is extended or adjusted under 35 U.S.C. 154(b) by 403 days.

(21) Appl. No.: 12/528,451

(22) PCT Filed: Feb. 26, 2008

(86) PCT No.: PCT/IB2008/050679
§ 371 (c)(1),
(2), (4) Date: Aug. 25, 2009

(87) PCT Pub. No.: WO2008/104928
PCT Pub. Date: Sep. 4, 2008

(65) Prior Publication Data
US 2010/0032551 A1  Feb. 11, 2010

(30) Foreign Application Priority Data
Mar. 1, 2007 (EP) .................................... 07103342

(51) Int. Cl.
*G01J 3/26* (2006.01)
*G01J 3/28* (2006.01)
*G01J 3/51* (2006.01)

(52) U.S. Cl. ...................... 250/226; 250/208.2; 356/419; 356/454

(58) Field of Classification Search ................ 250/208.2, 250/208.3, 208.6, 214.1, 226; 359/407, 417, 359/419, 454, 519; 356/407, 417, 419, 454, 356/519

See application file for complete search history.

(56) References Cited

U.S. PATENT DOCUMENTS

| | | | |
|---|---|---|---|
| 4,674,880 A | | 6/1987 | Seki |
| 4,757,210 A | * | 7/1988 | Bharat et al. ............... 250/208.6 |
| 4,822,998 A | | 4/1989 | Yokota et al. |
| 4,902,136 A | * | 2/1990 | Mueller et al. ................ 356/419 |
| 4,958,928 A | * | 9/1990 | Kuderer ........................ 356/328 |
| 5,144,498 A | | 9/1992 | Vincent |
| 5,166,755 A | | 11/1992 | Gat |
| 5,784,507 A | * | 7/1998 | Holm-Kennedy et al. ..... 385/31 |

(Continued)

FOREIGN PATENT DOCUMENTS
EP  1691495 A1  8/2006
(Continued)

OTHER PUBLICATIONS

Ahmadi et al:"An on Chip Signal Processing and Fabry-Perot Sensor Using Multi-Slopes Architecture"; Circuits and Systems, 2001, MWSCAS 2001, IEEE 2001, vol. 2, pp. 722-725.

(Continued)

*Primary Examiner* — John Lee
(74) *Attorney, Agent, or Firm* — Mark L. Beloborodov

(57) ABSTRACT

The invention relates to an optical detector device (1) for generating at least one electrical output signal in response to a received beam of light, comprising an optical band-pass filter (3a), adapted to receive the beam of light and to provide a filtered beam of light, which filter (3a) has a transmission wavelength which increases in direction of at least one axis (4) and an array of detector elements (2) arranged in direction of the axis (4) to receive the filtered beam of light for generating the electrical output signal.

11 Claims, 7 Drawing Sheets

U.S. PATENT DOCUMENTS

| | | | |
|---|---|---|---|
| 5,965,873 A | 10/1999 | Simpson et al. | |
| 5,973,311 A * | 10/1999 | Sauer et al. | 250/208.1 |
| 6,038,023 A * | 3/2000 | Carlson et al. | 356/326 |
| 6,295,130 B1 | 9/2001 | Sun et al. | |
| 6,303,943 B1 * | 10/2001 | Yu et al. | 257/40 |
| 7,084,973 B1 * | 8/2006 | Ingram | 356/326 |
| 7,202,955 B2 * | 4/2007 | Te Kolste et al. | 356/454 |
| 7,274,011 B2 * | 9/2007 | Tennant et al. | 250/226 |
| 7,400,404 B2 * | 7/2008 | Jung et al. | 356/407 |
| 7,420,677 B2 * | 9/2008 | Schmidt et al. | 356/417 |
| 7,426,040 B2 * | 9/2008 | Kim et al. | 356/519 |
| 7,453,575 B2 * | 11/2008 | Te Kolste et al. | 356/454 |
| 7,471,399 B2 * | 12/2008 | Kiesel et al. | 356/519 |
| 7,538,878 B2 * | 5/2009 | Jung et al. | 356/419 |
| 7,800,791 B2 * | 9/2010 | Kageyama et al. | 358/474 |
| 7,852,490 B2 * | 12/2010 | Kiesel et al. | 356/519 |
| 2002/0017612 A1 * | 2/2002 | Yu et al. | 250/370.11 |
| 2005/0205758 A1 * | 9/2005 | Almeida | 250/208.2 |
| 2006/0001882 A1 * | 1/2006 | Te Kolste et al. | 356/419 |
| 2006/0054795 A1 | 3/2006 | Cole et al. | |
| 2006/0209413 A1 * | 9/2006 | Kim et al. | 359/577 |
| 2010/0032551 A1 * | 2/2010 | Schulz et al. | 250/208.2 |

FOREIGN PATENT DOCUMENTS

JP       63097905 A       4/1988

OTHER PUBLICATIONS

Correia et al: "High-Selectivity Single-Chip Spectrometer in Silicon for Operation at Visible Part of the Spectrum"; IEEE Transactions on Electron Devices, vol. 47, No. 3, Mar. 2000, pp. 553-559.

* cited by examiner

OPTICAL DETECTOR DEVICE

FIELD OF THE INVENTION

The invention relates to an optical detector device for generating an electrical output signal based on a received beam of light and a method related thereto.

BACKGROUND OF THE INVENTION

Optical detector devices, which generate an electrical output signal upon exposure to a beam of light are known in the art. For example, common photodiodes are used to detect light and to generate an electrical current in dependence of the intensity of the incoming light, incident to its light-accepting surface.

Lately, colour-controllable LED lighting units are gaining significance in the market, for example for lighting and healthcare applications. A problem arises when a precise colour-control of the light is needed, for example within the above-mentioned applications. It is thus desirable to be able to detect not only the intensity, but further the spectral composition of the generated light. Especially in lighting environments with heterogeneous light sources, colour-stabilisation or colour-control of the LED lighting units is important. Thus, accurate optical detector devices are necessary, which are able to obtain information on the spectral composition of a beam of light.

Document U.S. Pat. No. 5,965,873 discloses an optical spectrometer, which allows to detect an input beam of light and to generate a corresponding electrical output signal. The spectrometer comprises a silicon substrate with integrally formed, stacked layers of photodiodes, each having an independent spectral response to the incoming light. A signal processing circuit weights each signal of the photodiodes to obtain an electrical output signal in response to the overall spectral composition according to a given sensitivity.

However, although such devices allow to obtain information over a given wavelength range, it is not easily possible to adapt the device to a desired wavelength range without major modifications to the set-up of the device. For the above applications, it would be desirable for the user to define the spectral response of the device, according to the specific application. It is therefore an object to provide an optical detector, which may be adapted to a desired spectral response in a very flexible way and which may be manufactured cost-efficiently.

SUMMARY OF THE INVENTION

The object is solved according to the invention by an optical detector device according to claim 1 and a method for generating at least one electrical output signal in response to a beam of light according to claim 10. Dependent claims relate to preferred embodiments of the invention.

The optical detector device according to the invention allows to detect a received beam of light and to generate at least one electrical output signal according to a desired spectral response. The optical detector device therefore comprises an optical band-pass filter, which is adapted to receive the beam and to provide a filtered beam, and an array of detector elements, which generate the electrical output signal in response to the filtered beam of light. To receive the beam, the optical band-pass filter may comprise a light-accepting surface.

The band-pass filter may be of any type, which is able to provide the filtered beam of light in response to the received beam. Exemplary types of suitable filters include thin-film filters and interference filters. According to the invention, the filter has one or more transmission wavelengths. Preferably, the filter has a pass band, i.e. multiple transmission wavelengths, wherein the width of the pass band is adapted to the desired application. Light, received at the transmission wavelengths may pass the filter to form the filtered beam. Other wavelengths are filtered or at least substantially attenuated. Thus, the filtered beam is provided with a specific spectral composition.

According to the present invention, the transmission wavelength of the band-pass filter increases in the direction of at least one axis, so that in this direction, also the spectral composition of the filtered beam varies. Naturally, the invention is not limited thereto and the transmission wavelength may also vary in further directions. In the case the filter provides a pass band instead of a single transmission wavelength, the centre-wavelength or peak wavelength of the pass band increases in the direction of the axis.

In the context of the present invention, the term "received beam" or "received beam of light" does not necessarily imply a directed or collimated beam, but is to be understood to include directed or non-directed light, which is received by the band-pass filter.

The filtered beam is received by the array of detector elements, arranged in the direction of the axis. The array of detector elements generates the electrical output signal in response to the filtered beam. The detector elements may be of any suitable type, which generate an electrical output signal in response to light received. For example, the detector elements may include photo sensors, photomultipliers or photodiodes. Due to the arrangement of the detector elements in the direction of the axis and the increasing transmission wavelength of the band-pass filter in that direction, the detector elements receive light with a varying transmission wavelength and thus each detector element receives light with a specific spectral composition. Thus, the individual spectral components of the incident lights lead to corresponding signals from selected ones of the detector elements.

Using the optical detector device according to the invention, it is thus possible to detect light and to generate an electrical output signal with a desired spectral response by choosing one or more detector elements, which shall contribute to the output signal (and, if desired, exclude other elements from contributing to the final output). In this way, it is advantageously possible for a user to configure the spectral response of the optical detector device.

To obtain the electrical output signal, each detector element may be separately connected to a suitable electrical circuit, for example, to inputs of a microcontroller or a computer. The spectral response of the signal may then be configured by switching on and off the respective inputs of the microcontroller. The microcontroller may further process the signals of the detector elements, for example, according to given weights, to obtain an overall output signal according to a desired spectral response.

In a preferred embodiment of the invention, a plurality of detector elements are electrically connected in a parallel circuit to generate the electrical output signal. The present embodiment reduces the complexity of the necessary electrical circuitry advantageously. Most preferred, all detector elements are electrically connected in a parallel circuit to further reduce the complexity of the electrical circuit. In this case, a final output signal may be generated from all connected detector elements.

Preferably, each detector element comprises configurable circuit breaking means to individually disconnect the detector element from the circuit. The circuit breaking means may be of any type, which is able to temporarily or permanently disconnect the respective detector element from the circuit. For example, the circuit breaking means may be a fuse or a connection, which can be disconnected permanently by means of electrical or optical energy, for example, laser energy or UV-light. Using such a "one-time" configurable connection, the detector device can be configured a single time to a desired spectral response. For various applications, such a "one-time" configurable detector device may be sufficient, for example for colour-control of an LED light source in a lighting environment.

Alternatively, the circuit breaking means may allow a temporary disconnection of the respective detector element. In this case, the circuit breaking means may be, for example, a relay, a transistor or any other manually or electrically controllable switch. Here, the detector device is reconfigurable to a desired spectral response. Before a measurement of the spectral composition is taken, the respective detector elements which shall not contribute to the output signal are chosen and subsequently disconnected from the circuit. After the measurement, the device may be easily reconfigured to a further spectral response. Such a reconfigurable detector device may be, for example, used as an micro-optical spectrometer or in any case, when information of the spectral composition over a broad wavelength range is necessary.

The transmission wavelength of the band-pass filter increases in the direction of the axis. The course of the increase in the transmission wavelength may be adapted to the type of detector elements used, for example, the increase could follow a step-like profile, wherein the transmission wavelength over one or more of the detector elements is constant. According to a preferred embodiment of the invention, the transmission wavelength of the band-pass filter increases gradient-like in the direction of the at least one axis. In the context of the present invention, the term "gradient-like" refers to a course of increase, where between all neighbouring points in the direction of the at least one axis, the transmission wavelength increases steadily. This preferred embodiment advantageously further simplifies the manufacture of the band pass-filter.

Preferably, the optical band-pass filter is a Fabry-Perot filter, wherein the Fabry-Perot filter cavity has an increasing thickness in direction of the axis. The Fabry-Perot filter is based on interference between two reflective surfaces, which are partially transmissive, and are separated by a transparent dielectric cavity. This cavity forms a resonator. Wavelengths, for which the resonance condition is fulfilled, pass the filter, while the filter does not transmit other wavelengths. The resonance condition in a Fabry-Perot filter can be manipulated by varying the distance of the dielectric surface along the optical axis. Since the thickness of the Fabry-Perot filter cavity is increased in the direction of the at least one axis, the filter advantageously provides an increasing transmission wavelength in this direction.

According to a preferred embodiment of the invention, the array of detector elements is arranged two-dimensional in an area, which area is defined by the first axis and a second axis. The filter covers that area and has an increasing transmission wavelength in the direction of the first axis and a constant transmission wavelength in the direction of the second axis, arranged at an angle (preferably, but not necessarily at right angles) with the first axis. While the detector elements, arranged in direction of the first axis receive light with an increasing transmission wavelength, the detector elements arranged in direction of the second axis receive light with a constant transmission wavelength. Thus, multiple detector elements, arranged in direction of the second axis receive light with substantially the same transmission wavelength.

Exemplary, this set-up may be "matrix-like", having rows and columns. Rows are arranged in the direction of the second axis. The detector elements, arranged in a row, receive light with substantially the same transmission wavelength. Columns are arranged in direction of the first axis. In this direction, the transmission wavelength of the band-pass filter increases and thus the detector elements, arranged in a column receive light with an increasing transmission wavelength.

By choosing one or more of the detector elements arranged in a row which shall contribute to the output signal, it is advantageously possible to weight the output signal for the specific wavelength and thus to control the sensitivity per wavelength. For example, if two detector elements, arranged in a row at a constant transmission wavelength, are chosen, the effect of the intensity of light, received at the transmission wavelength will be twice the signal, as received by a single detector element. A complex electrical circuit or a microprocessor is advantageously not necessary to obtain a weighted electrical output signal according to a desired spectral response.

Preferably, each detector element comprises a photodiode with a light-accepting surface, which surface increases in the direction of the second axis. By increasing the light-accepting surface in the direction of the second axis, the photodiodes will contribute with increasing weight to the output signal in this direction. Each detector element thus has a specific weight on the output signal. Using this preferred embodiment, obtaining a weighted output signal is further improved. Most preferably, the surface between two neighbouring detector elements, arranged in direction of the second axis, is increased by a factor 2. This embodiment enables a "bit-wise" control of the sensitivity per wavelength. Exemplary, having eight photodiodes arranged in a row, an "8-bit" control of the sensitivity per wavelength is possible, which allows a most advantageous control of the spectral response of the device.

According to a further preferred embodiment of the invention, an optical observation device is provided which comprises an optical detector device with controllable circuit breaking means. The observation device has a controller unit that can store sets of control information for the circuit breaking means. Each of these sets of control information corresponds to a certain switching pattern of the circuit breaking means, which corresponds to a resulting spectral response of the optical detector. The controller unit may be adapted to apply different ones of these sets to the detection device, thus leading to a spectral response that changes accordingly. In an embodiment, the stored sets are applied sequentially upon receipt of a trigger input, giving a spectral response that changes over time according to the predefined sequence of switching patterns given by these sets.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

Figure 1:
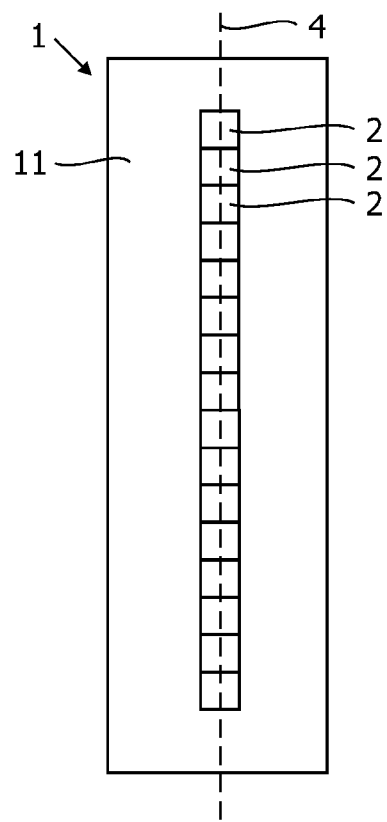
FIG. 1 shows a first embodiment of the invention in a front view.
Figure 2:
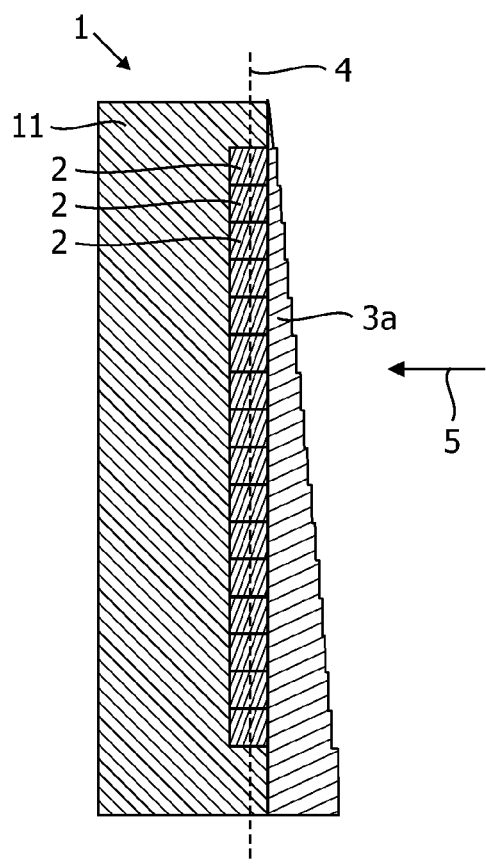
FIG. 2 shows a cross-sectional side view of the embodiment of FIG. 1.

FIG. 1 shows a first embodiment of the detector device 1 in a front view. The detector device has a substrate 11 with an array of photodiodes 2, arranged in a column in the direction of a first axis 4. Each of the photodiodes 2 exhibit an equal sized light-accepting surface, as can be seen from FIG. 1. The optical axis of the detector device 1 is perpendicular to the drawing plane. The photodiodes 2 are electrically connected (not shown) to obtain an output signal in response to the received beam of light. In front of the photodiodes 2, a Fabry-Perot band-pass filter 3a is arranged, as can be seen from the side view of FIG. 2. The band-pass filter 3a provides a filtered beam in response to an incoming beam, represented by arrow 5. The filtered beam is subsequently received by the photodiodes 2.

The band-pass filter 3a comprises a transparent, dielectric filter cavity separating two partially reflective surfaces, which are arranged perpendicular to the optical axis of the incoming beam 5. Examples of the filter 3a comprise a transparent dielectric, the opposing surfaces are coated to become partially reflective. The band-pass filter 3a shows a step-like profile and the thickness of the filter cavity increases in the direction of the first axis 4. Due to the increasing thickness of the filter cavity 3a, the transmission wavelength of the filtered beam of light is increased in this direction, so that each of the photodiodes 2 receive light with a specific transmission wavelength. By choosing one or more of the photodiodes 2 which shall contribute to the output signal, the detector device 1 can be easily adapted to a desired spectral response. To obtain the output signal, the photodiodes 2 are separately connected to a microprocessor (not shown), which selects the respective photodiodes 2, so that the output signal corresponds to the desired spectral response.

Figure 3:
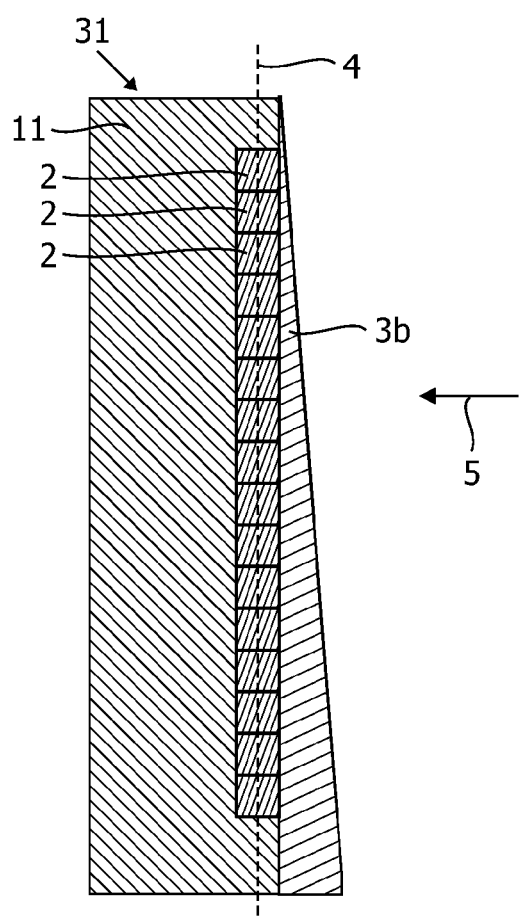
FIG. 3 shows a second embodiment in a cross-sectional side view.

The device 1 according to the present embodiment provides a filtered beam with relatively narrow pass-bands. An alternative filter 3b according to a second embodiment of a detector device 31 is shown in a cross-sectional side view in FIG. 3. Here, the thickness of the filter 3b and thus the transmission wavelength increases "gradient-like" or steadily. The filter 3b provides a filtered beam with broader pass-bands than the filter 3a due to the gradient of the outer surface of the filter 3b and the corresponding reflections within the filter 3b.

The filter cavity of the filters 3a, 3b may be made of $SiO_2$ with an index of refraction of 1.4. The reflective/transmissive coating may be a metal coating, such as Ag or Al, with a thickness of e.g. 5-20 nm.

The thickness of the filter cavity is chosen to be at around a quarter of the wavelength of the light to be filtered (within the filter cavity). For example, if the peak spectral response of filter 3a should vary (from top to bottom in FIG. 2, FIG. 3) from 400 nm to 800 nm, the thickness will be from $$d = \frac{400}{4\sqrt{1.4}} \text{ nm to } d = \frac{800}{4\sqrt{1.4}} \text{ nm.}$$

Further information about the manufacture of Fabry-Perot filters, may be found in the following document, incorporated herein by reference: J. Correia, M. Bartek & R. F. Wolffenbuttel. High-selectivity single-chip spectrometer in silicon for operation at visible part of the spectrum. IEEE Transactions on Electron Devices 47, 553-559 (2000).

Figure 4:
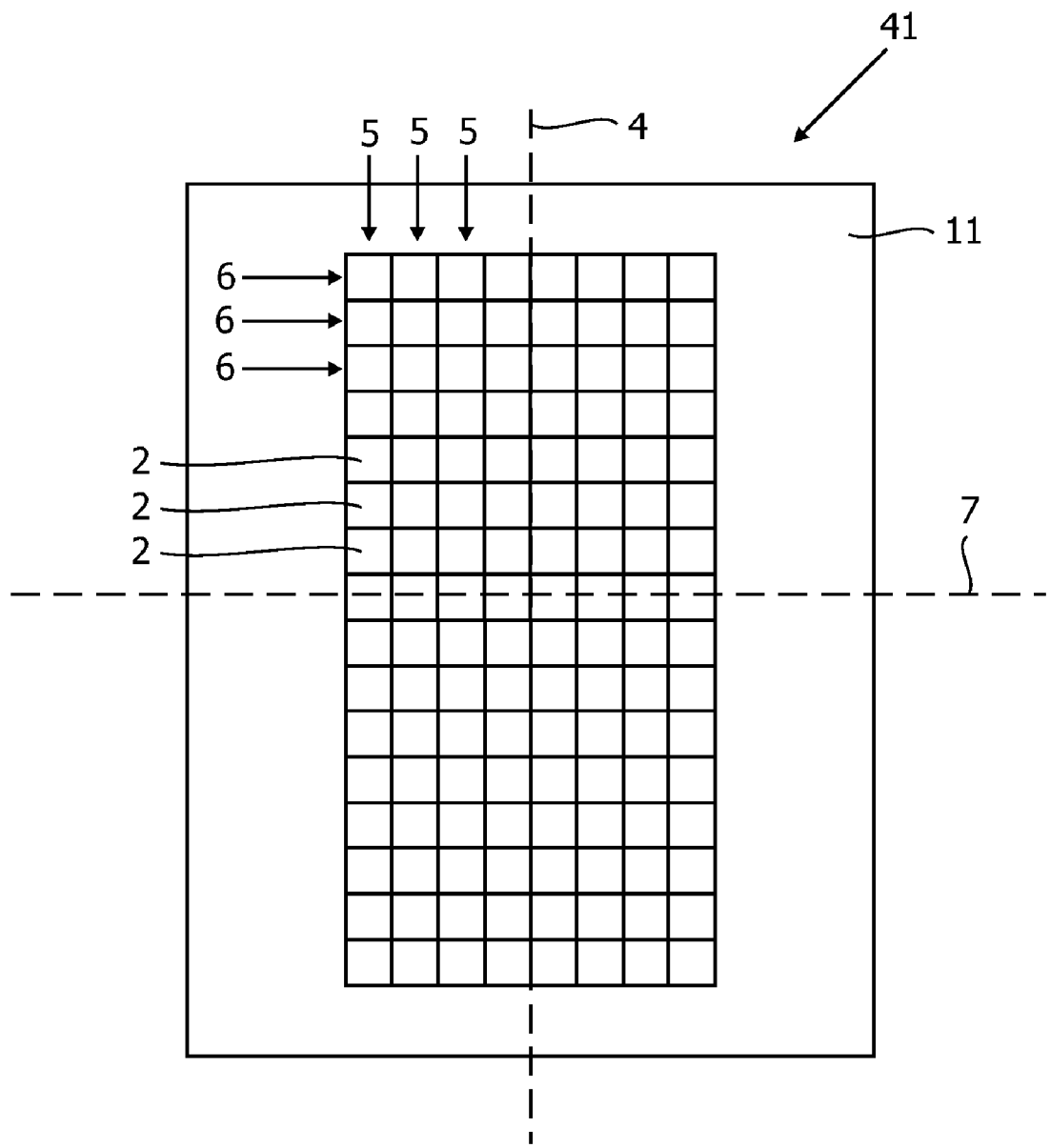
FIG. 4 shows a third embodiment in a front view.

A front view of a third embodiment of a detector device 41 is shown in FIG. 4. According to the present embodiment, the photodiodes 2 are arranged in a matrix in columns 5 in direction of the first axis 4 and rows 6 in direction of a second axis 7. A Fabry-Perot filter (not shown) covers the area of the photodiodes 2. The transmission wavelength of the filter increases in the direction of the first axis 4 and is constant in the direction of the second axis 7. Thus, the photodiodes 2 arranged in a column 5 receive light with a varying transmission wavelength. Accordingly, the respective photodiodes 2 in each row 6 receive light with a constant wavelength. The side-view of the device 1 according to the present embodiment corresponds to the side-view, shown in FIG. 3.

Figure 5:
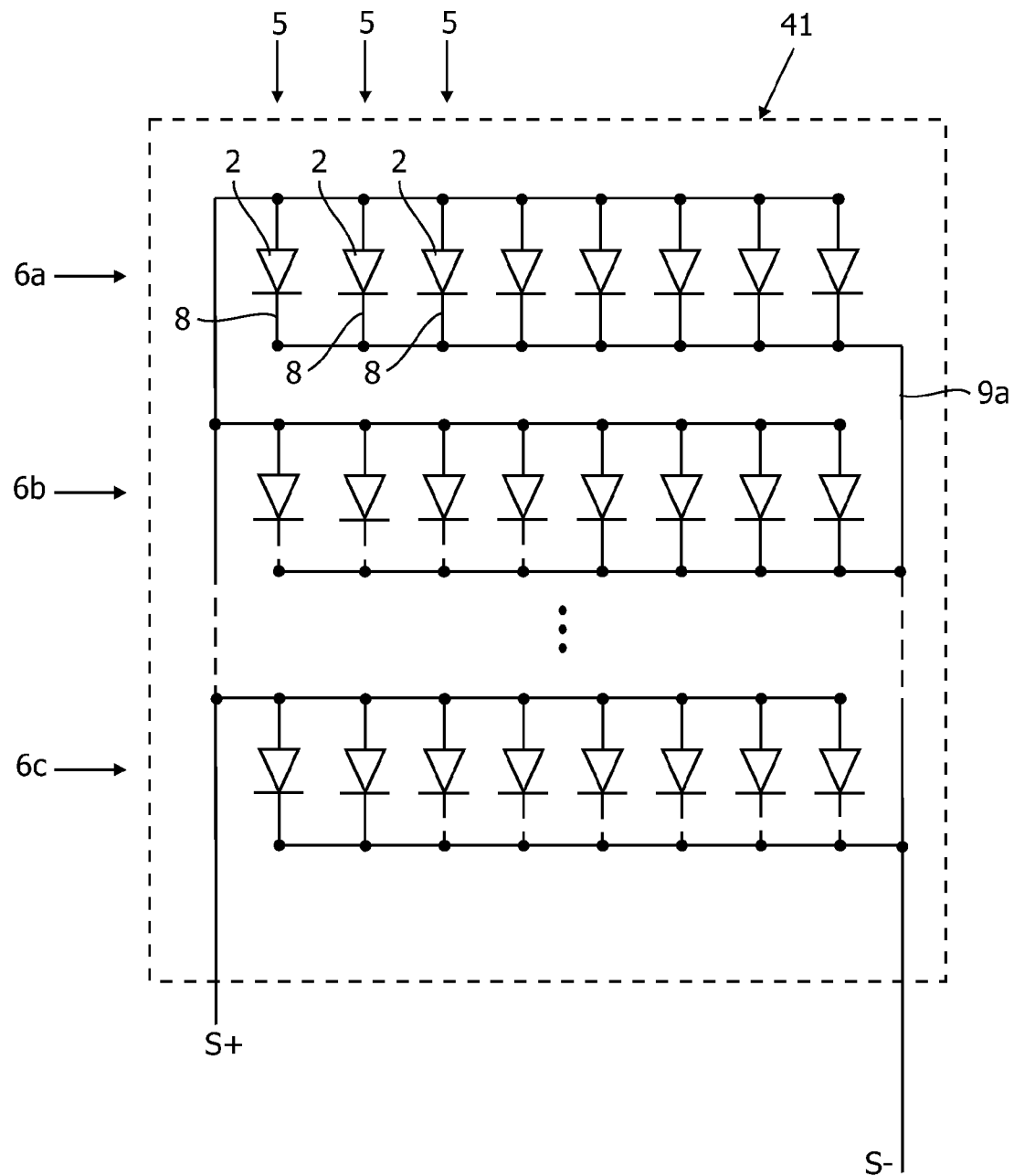
FIG. 5 shows an exemplary circuit diagram of the embodiment of FIG. 4.

By choosing one or more photodiodes 2 in a row 6, it is possible to control the sensitivity of the device 41 per wavelength, since the effective light-accepting surface of the photodiodes 2 per wavelength can be controlled. It is thus possible to obtain a weighted output signal according to a desired spectral response by choosing the respective number of photodiodes 2 which shall contribute to the output signal. An exemplary electrical circuit diagram to obtain the output signal S is shown in FIG. 5.

As can be seen from the figure, the photodiodes 2, arranged in respective rows 6 and columns 5, are connected in a parallel circuit 9a. For clarification, only three rows 6a-6c of photodiodes 2 are shown. In series to each photodiode a fuse 8 is arranged. The fuse 8 serves to break the corresponding connection and to disconnect the respective photodiode 2 from the circuit 9a. It is thus possible, to set the sensitivity per wavelength and to obtain a weighted output signal S according to a desired spectral response. The fuses 8 can be disconnected by laser power and are thus "one-time" configurable connections. Such "one-time" configurable connections may be particular useful in applications, where the user needs to set the spectral response only once, for example in fixed LED lighting applications for monitoring, colour-control and colour-stabilisation of LED light sources.

An exemplary setting of the fuses 8 can be seen from the figure. While in the top row 6a all eight fuses 8 are connected, in the middle row 6b, only four fuses 8 and in the lower row 6c, only two fuses 8 are connected. Assuming a weight of the eight photodiodes 2 in the top row 6a on the output signal of 1, the corresponding weight of the photodiodes 2 in the middle row 6b is ½ and the weight of the photodiodes 2 in the lower row 6c is ¼. Thus, a weighted output signal for the exemplary three wavelengths is obtained.

Figure 6:
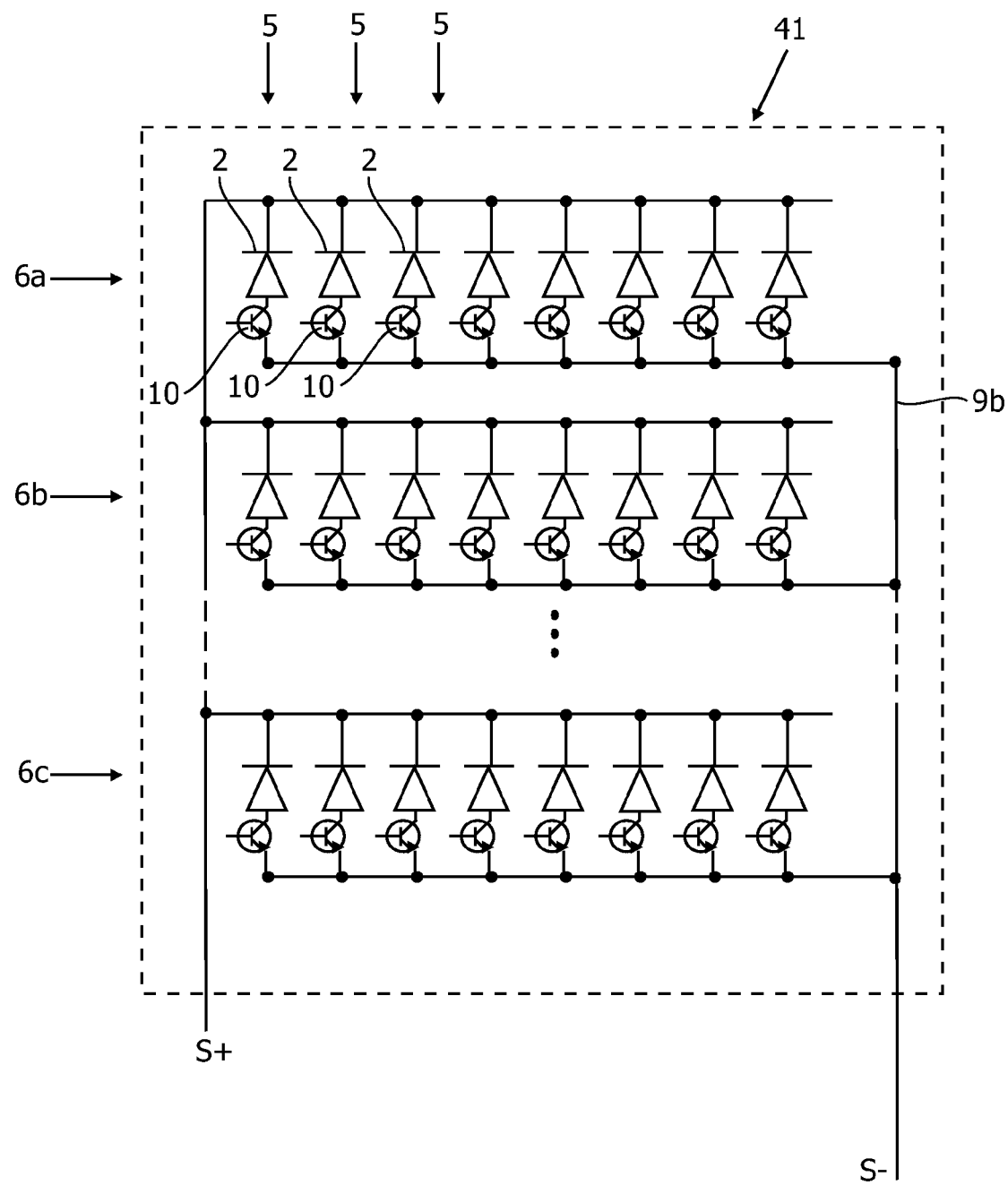
FIG. 6 shows a further exemplary circuit diagram of the embodiment of FIG. 4

A further exemplary circuit diagram is shown in FIG. 6. Here, transistors 10 replace the above-mentioned fuses 8. The circuit 9b according to the figure allows reconfiguring the detector device 41 to a spectral response. Such a device 41 may be, for example, used as an micro-optical spectrometer.

Figure 7:
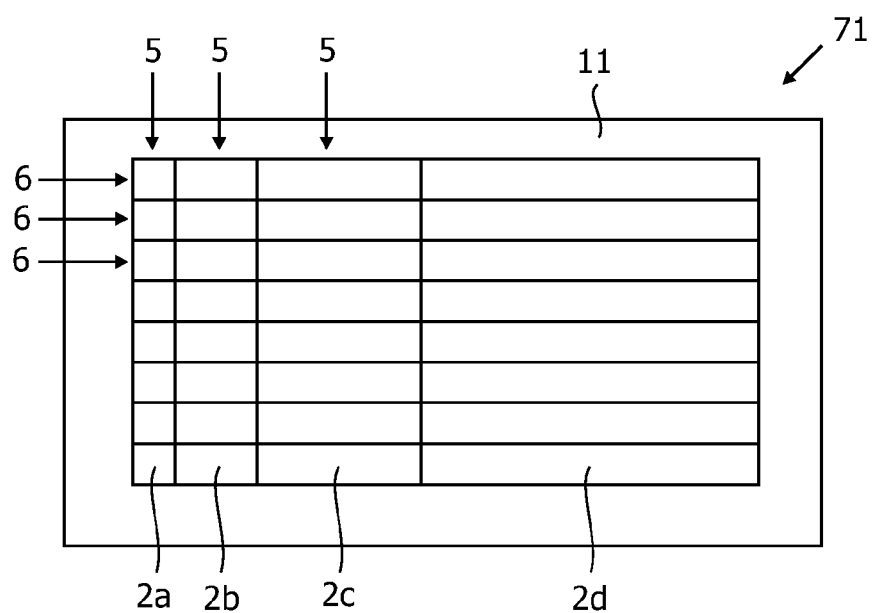
FIG. 7 shows a fourth embodiment in a front view.

A fourth embodiment of a detector device 71 is shown in a front view in FIG. 7. As can be seen from the figure, the light-accepting area of two neighbouring photodiodes 2a-2d, arranged in a row 6, is increased by a factor 2. Thus, it is possible to obtain a "bit-wise" weighted output signal. For example, assuming a weight of 1 of the photodiodes 2a, the corresponding weight of the photodiodes 2b is 2, so that when combining the signals of photodiodes 2a and 2b, a weight of 3 can be obtained. A weight of 4 can be obtained when choosing photodiode 2c and a weight of 7 can be obtained when combining the output signals of photodiodes 2a-2c. Thus, it is easily possible to bit-wise control the sensitivity per wavelength.

The detector devices shown above may be used for different purposes. Depending on the expected amount of incident light, the size of the devices may therefore vary considerably. If, for example, a detector device is arranged next to light sources, such as LEDs, to sense the spectral composition of the emitted light, the light-accepting areas of the photodiodes may be quite small. For example, in the detector device 71 shown in FIG. 7, the smallest light-accepting areas 2a may be in the order of 10×10 µm, whereas the largest areas 2d may be 10×80 µm.

Figure 8:
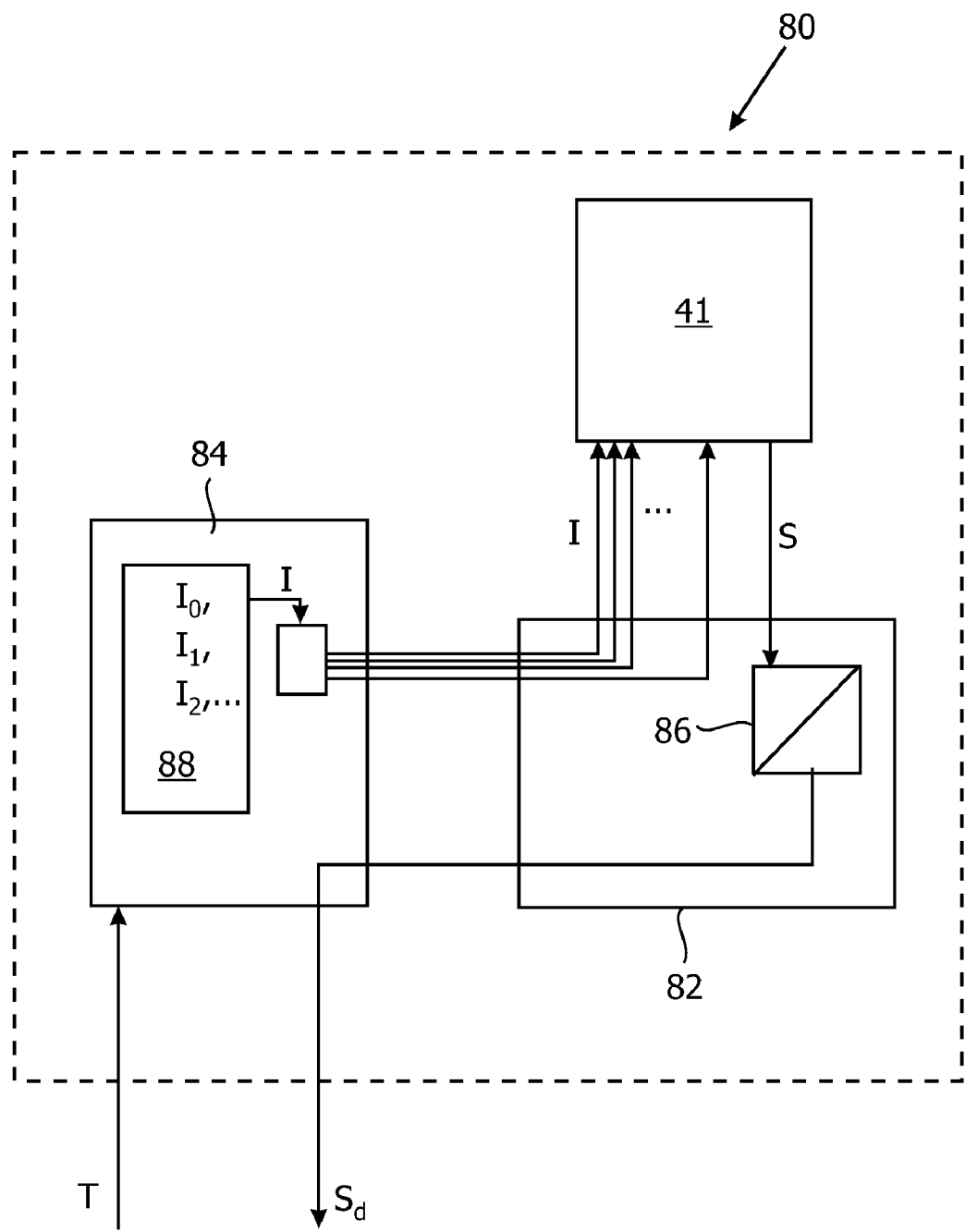
FIG. 8 shows a schematic representation of an optical observation device using the detector device of FIG. 6.

FIG. 8 shows a schematic representation of an optical observation device 80. The observation device comprises a detector device 41 as shown in FIG. 6. The detector device 41 outputs an analogue, summary output signal S and accepts input I as a plurality of input switching signals to the individual transistors 10.

The device 80 further comprises a data acquisition unit 82 and a controller unit 84. The data acquisition unit 82 comprises at least one analogue/digital converter ADC 86 to convert the analogue output signal S to a digital output signal $S_d$.

The controller unit 84 comprises a memory 88 storing different vector values I comprised of individual switching values for each of the transistors of the device 41. Each of these vector values I corresponds to a switching pattern of the switches implemented by these transistors.

In operation, the controller unit 84 operates to sequentially provide different input vectors I to the device 41 over time. If a trigger input T, is received, a predefined, pre-stored sequence of switching patterns $I_0, I_1, I_2, \ldots$ is time-sequentially recalled from memory 88 and applied to the detector device 41. This will lead to observation device 80 acting as a sensor that can change the spectral response over time.

While the above example shows only one ADC 86, the optical detector 41 may comprise several parallel channels, and the data acquisition unit 82 will preferably comprise a corresponding number of ADCs for each of these channels. Additionally, the data acquisition unit 82 may comprise programmable amplifiers for each of the received analogue signals S. In each time step, an amplification value for each of the programmable amplifiers may be called from memory 88.

The invention has been illustrated and described in detail in the drawings and foregoing description. Such illustration and description are to be considered illustrative or exemplary and not restrictive; the invention is not limited to the disclosed embodiments.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical detector device for generating at least one electrical output signal in response to a received beam of light, comprising:
   an optical band-pass filter configured to receive the beam of light and to provide a filtered beam of light, which filter transmits light at transmission wavelengths that increase in a direction of at least a first axis; and
   an array of detector elements electrically connected in a parallel circuit and arranged in the direction of the first axis to receive the filtered beam of light for generating the at least one electrical output signal, each detector element comprising configurable circuit breaking means for individually disconnecting the detector element from the circuit, wherein said parallel circuit is configured to weight each particular wavelength of at least one of the wavelengths by adjusting an effective light-accepting surface area of said detector elements for the particular wavelength.

2. The optical detector device according to claim 1, wherein the optical band-pass filter is a Fabry-Perot filter comprising a filter cavity with increasing thickness in the direction of the first axis to provide the increasing transmission wavelengths.

3. The optical detector device according to claim 1, wherein the array of detector elements is arranged in an area defined by the first axis and a second axis, wherein the filter covers said defined area and transmits light at a constant transmission wavelength in a direction of the second axis.

4. The optical detector device according to claim 3, wherein each detector element comprises a photodiode with a corresponding light accepting surface, wherein lengths the corresponding light accepting surfaces for the given wavelength increase in the direction of the second axis.

5. The optical detector device according to claim 1, further comprising:
   a controller unit comprising a memory for storing a plurality of sets of control commands (I) for the controllable circuit breaking means, where the controller unit is adapted to apply different ones of said sets ($I_0, I_1, I_2, \ldots$) to said parallel circuit to achieve changing a spectral response.

6. The optical detector device according to claim 5, where said controller unit is adapted to, upon receipt of a trigger input (T), sequentially apply said sets ($I_0, I_1, I_2, \ldots$) to said parallel circuit to achieve a spectral response that changes over time.

7. A method for generating at least one electrical output signal in response to a beam of light with an optical detector comprising an optical band-pass filter, which filter transmits light at transmission wavelengths that increase in a direction of at least a first axis and an array of detector elements arranged in the direction of the first axis, wherein a plurality of detector elements are electrically connected in a parallel circuit to generate the electrical output signal and each detector element comprises configurable circuit breaking means to individually disconnect the detector element from the circuit, wherein light is received by the filter and a filtered beam of light is provided, which filtered beam of light is received by the array of detector elements to generate said at least one output signal and wherein before the electrical output signal is generated, one or more detector elements are selected and disconnected from the circuit by the circuit breaking means, so that only the remaining detector elements contribute to the electrical output signal, and wherein said parallel circuit is configured to weight each particular wavelength of at least one of the wavelengths by adjusting an effective light-accepting surface area of said detector elements for the particular wavelength.

8. The method according to claim 7, wherein the adjusting the effective light-accepting surface area comprises adjusting the surface area for the particular wavelength in a direction along a second axis.

9. The method according to claim 8, wherein the filter transmits light along the second axis at a given, constant transmission wavelength.

10. The optical detector device according to claim 1, wherein the adjusting the effective light-accepting surface area comprises adjusting the surface area for the particular wavelength in a direction along a second axis.

11. The optical detector device according to claim 10, wherein the filter transmits light along the second axis at a given, constant transmission wavelength.

* * * * *